(12) United States Patent
Hofmeister et al.

(10) Patent No.: US 7,044,656 B1
(45) Date of Patent: May 16, 2006

(54) ADAPTER FOR INTEROPERABILITY BETWEEN OPTICAL TRANSCEIVER AND LEGACY COMPONENTS

(75) Inventors: Rudolf J. Hofmeister, Sunnyvale, CA (US); Lewis B. Aronson, Los Altos, CA (US)

(73) Assignee: Finisar Corporation, Sunnyvale, CA (US)

( * ) Notice: Subject to any disclaimer, the term of this patent is extended or adjusted under 35 U.S.C. 154(b) by 261 days.

(21) Appl. No.: 10/771,193

(22) Filed: Feb. 3, 2004

Related U.S. Application Data

(60) Provisional application No. 60/444,753, filed on Feb. 4, 2003.

(51) Int. Cl.
*G02B 6/36* (2006.01)
(52) U.S. Cl. .............................. 385/89; 385/53; 385/88
(58) Field of Classification Search ................ 385/53, 385/88, 89
See application file for complete search history.

(56) References Cited

U.S. PATENT DOCUMENTS 6,665,497 B1 * 12/2003 Hamilton-Gahart et al. 398/135
6,951,426 B1 * 10/2005 Weber .......................... 385/88

* cited by examiner

*Primary Examiner*—Jennifer Doan
(74) *Attorney, Agent, or Firm*—Workman Nydegger

(57) ABSTRACT

Interfacing 300 pin legacy systems and devices with XFP module designs. An adapter includes a 300 pin connector for connecting to a 300 pin legacy system. The 300 pin connector is connected to circuitry for converting parallel signals from the 300 pin legacy system to serial high-speed XFI signals. The circuitry can also convert serial high-speed XFI signals to parallel signals. The circuitry is also connected to an XFI connector for transmitting and receiving high speed XFI signals to and receiving high-speed XFI signals from an XFP module.

16 Claims, 5 Drawing Sheets

ADAPTER FOR INTEROPERABILITY BETWEEN OPTICAL TRANSCEIVER AND LEGACY COMPONENTS

CROSS REFERENCE TO RELATED APPLICATION

This application claims the benefit of U.S. Provisional Application No. 60/444,753 filed Feb. 4, 2003 which is incorporated herein by reference.

BACKGROUND OF THE INVENTION

1. The Field of the Invention

The invention generally relates to providing an interface module for connecting communication components with different communication protocols. More specifically the invention relates to an interface module for connecting, for example, a legacy 300 pin 10 Gigabit, sixteen-bit interface (XSBI) or a or Serializer/Deserializer Framer Interface-4 (SFI-4) system with an optical transceiver module having a different interface.

2. Description of the Related Art

In the field of data transmission, one method of efficiently transporting data is through the use of fiber optics. Digital data is propagated through a fiber optic cable using light emitting diodes or lasers. Light signals allow for extremely high transmission rates and very high bandwidth capabilities. Also, light signals are resistant to electromagnetic interference that would otherwise interfere with electrical signals. Light signals are more secure because they do not allow portions of the signal to escape from the optical fiber as can occur with electrical signals in wire-based systems. While there may be an evanescent field that enables one to siphon some portion of the light off the fiber by bending the fiber such that it is possible to tap fiber communications without breaking the fiber, it is in general much more difficult than for electrical communications. Light also can be conducted over greater distances without the signal loss typically associated with electrical signals on copper wire.

Although fiber optic networks exhibit the desirable characteristics described above, there continues to exist a need for using other types of communication devices. For example, most computers or other electronic devices that communicate using optical networks are electrical, and conduct electrical signals over electrically conductive materials. Additionally, in the networking context, electrical networks that transmit electrical signals continue to be widespread. For these and other reasons, optical networks typically include optical transceivers that represent interfaces between electrical components and optical portions of the network.

One particular electrical conducting based protocol and physical construction is based on the 300 pin standard. The 300 pin standard refers in one aspect to the physical construction for a connector layout for interfacing with other 300 pin devices and system. The communication interfaces associated with the 300 pin standard include the Serializer/Deserializer Framer Interface-4 (SFI-4) of the Optical Internetworking Forum (OIF) and the derivative 10 Gigabit, Sixteen-Bit Interface (XSBI) of the 10 Gigabit Ethernet Alliance. The XSBI standard is the interface used in conjunction with the 10-Gigabit Ethernet standard. The SFI-4 standard is the interface associated with the SONET (Synchronous Optical Network) protocol. Components using these two interfaces are generally cross compatible, such that a component designed for one of the interfaces can also function with the other interface standard. The 300 pin architecture has several drawbacks, including a fragmented protocol, physical connectors that are mechanically unreliable, and associated z-mount devices that are not hot-pluggable. In spite of these drawbacks, the 300 pin architecture has enjoyed significant market penetration, and there are a substantial number of 300 pin standard devices in existing 300 pin systems. There has, therefore, been a movement to interface systems based on the 300 pin architecture with devices having other interfaces that are easier and more user friendly in their implementation.

One prior art example of a device used to interface 300 pin system to a fiber optic network is shown in FIG. 1, which illustrates an optical transceiver module designated generally as 100, and otherwise known as an XBI module. Also shown in FIG. 1 is a 300 pin physical layer integrated circuit (IC) 102. The 300 pin physical layer IC 102 is connected to a 300 pin mating connector 104 for interfacing with a corresponding 300 pin connector 106 in the optical transceiver module 100.

The 300 pin protocol standard defines a parallel communication link with 16 communication lines in both transmit and receive directions. Each communication line uses a two-wire differential connection, meaning that the 16 transmit lines require thirty-two physical connections to accomplish the parallel transmit communication. The 300 pin receptacle 106 has a 16-line transmit bus 108 that feeds a 16-line parallel data transmission from the 300 pin physical layer IC 102 into a multiplexer 110. The multiplexer 110 converts the parallel data on the transmit bus 108 into a serial high-speed data transmission. This serial high-speed data transmission is sent to a laser diode driver 112. The laser diode driver 112 converts the serial high-speed data transmission into a modulated electrical drive current for driving a laser diode 114. By modulating the laser diode 114, an optical signal is generated and propagated onto a fiber optic network through an optical output port 116.

In the receive path, an optical signal representing a serial high-speed data stream is received by an optical input port 118 on the optical transceiver module 100. The optical signal is focused onto a photodiode 120 that converts the optical signal into electrical pulses. The electrical pulses are sent to a trans-impedance amplifier 122 and a post amplifier 124, the combination of which digitizes the signals into a serial high-speed data stream. The serial high-speed data stream is propagated through a serial connection into a demultiplexer 126. The demultiplexer 126, using an appropriate clock signal 128, converts the serial high-speed data stream into a 16-line parallel data stream that is sent through a 16-line receive bus 130, the 300 pin connector 106, and the 300 pin mating connector 104 to the 300 pin physical layer IC 102. In this manner, a 300 pin standard system is interfaced with a fiber optic network.

Although the interfaces and connectors described above are useful for establishing communication between the 300 pin physical layer IC and the optical network, there are certain disadvantages associated with the optical transceiver module 100 illustrated in FIG. 1. For instance, the optical transceiver module generally has a large form factor and a number of discrete electrical components, such as the multiplexers, demultiplexers, and amplifiers. More integrated optical transceivers with fewer discrete components and a smaller form factor have been developed recently, but such newer optical transceivers have not been compatible with legacy interfaces, such as those associated with the 300 pin connectors and interfaces described above.

BRIEF SUMMARY OF THE INVENTION

One embodiment of the invention includes an adapter module for interfacing 300 pin systems with an XFP optical transceiver module. The adapter module includes a 300 pin connector for mating with a mating connector on a 300 pin device. A parallel transmit bus is connected to the 300 pin connector for carrying a parallel data transmission. A multiplexer is connected to the parallel transmit bus. The multiplexer converts the parallel data transmission to a high-speed XFI data transmission. An XFI connector is connected to the multiplexer through a serial transmit line. The XFI connector is connectable to an XFP module. A demultiplexer is connected to the XFI connector by a serial receive line. The demultiplexer converts a serial high speed XFI signal into a parallel data stream. A parallel receive bus is connected to the demultiplexer and transmits the parallel data stream from the demultiplexer to the 300 pin connector.

Another embodiment of the invention includes a printed circuit board layout for providing a 300 pin connection to an XFP optical transceiver design. The printed circuit board includes 300 pin connector traces that can accept a 300 pin connector for mounting on a printed circuit board. The printed circuit board layout further includes component traces connected to the 300 pin connector traces. The component traces are arranged to allow various components to be populated on the printed circuit board. The various components may include components that are used to convert signals using a 300 pin protocol to and from signals using an XFI protocol. XFP traces are connected to the component traces. The XFP traces are arranged to allow a circuit designer to design XFP circuitry including module traces that extend from the XFP traces.

A method is also disclosed for designing transceivers. The method includes receiving a printed circuit board layout, where the printed circuit board layout includes 300 pin connector traces, component traces connected to the 300 pin connector traces, and XFP traces connected to the 300 pin connector traces. The method also includes testing an XFP module in a 300 pin system using an adapter, where the adapter includes a 300 pin connector connected to circuitry for converting 300 pin signals to XFI signals, where the circuitry is further connected to an XFI connecter connected to the XFP module. If testing indicates that the XFP module is compatible with the 300 pin system, the method further includes forming the printed circuit board layout on a printed circuit board and forming XFP layout traces connected to the printed circuit board traces on the printed circuit board.

BRIEF DESCRIPTION OF THE SEVERAL VIEWS OF THE DRAWINGS

In order that the manner in which advantages and features of the invention are obtained, a description of the invention will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
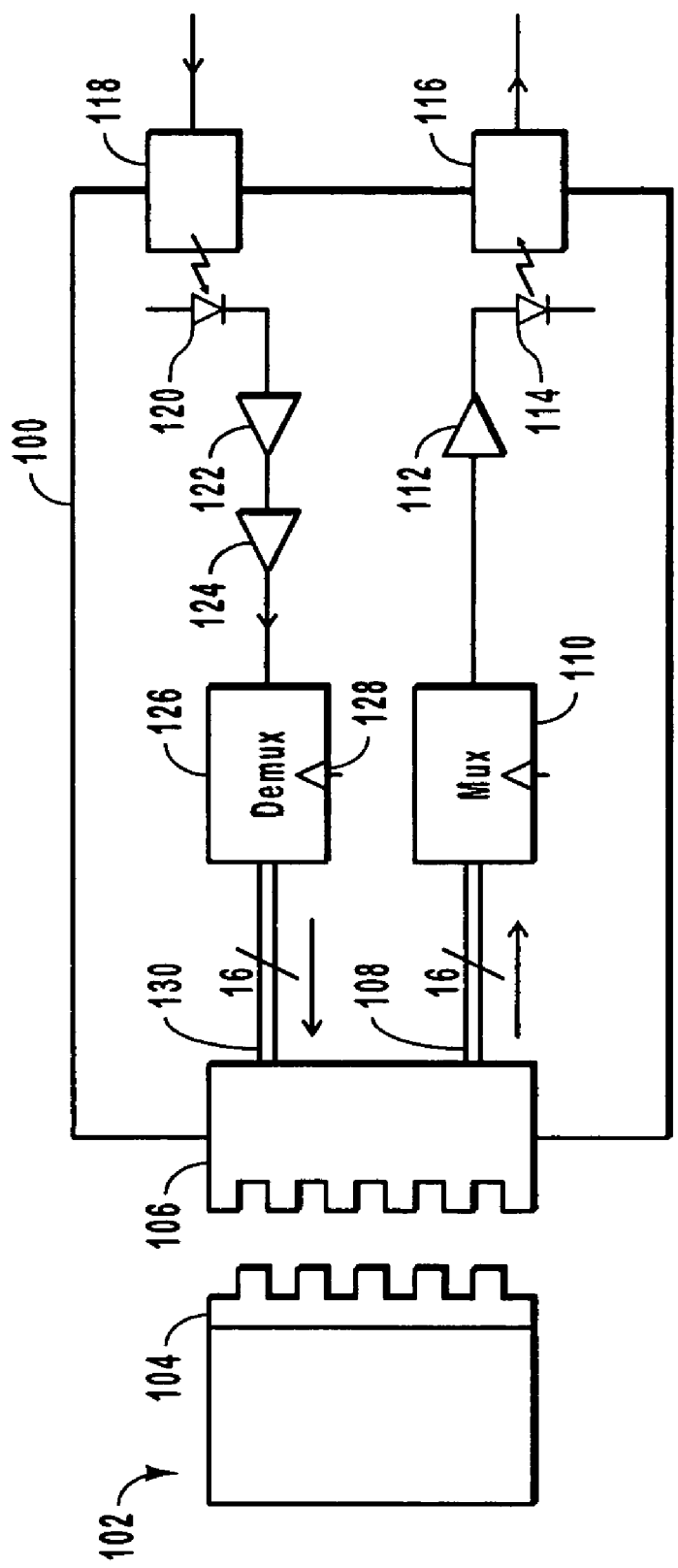
FIG. 1 illustrates an XBI module useful for interfacing a 300 pin system to a fiber-optic network.

Recently-developed optical transceivers that are highly integrated and have relatively small form factors include the 10 Gigabit Small Form Factor Pluggable (XFP) modules defined by the XFP Multi Source Agreement (MSA) Group. These XFP modules are desirable because they have a smaller form factor (about ⅕th) compared with other 10 Gigabit devices and use only about one-half of the power. The XFP modules incorporate a 10 Gigabit serial electrical interface (XFI) that allows the XFP modules to be selectively installed into electrical or computing devices that are to communicate using an optical network. Prior to the invention, there have not been any suitable systems for quickly and efficiently interfacing XFP modules with 300 pin systems, including legacy 300 pin connectors that are commonly used in existing electrical or computing systems.

The invention is directed in one embodiment to an adapter module for interfacing 300 pin systems with XFP modules. The adapter modules disclosed herein may be used as a test-bed for testing compatibility between existing 300 pin systems and various XFP modules. When testing has been successfully completed, embodiments of the invention may be used as the foundation for products incorporating XFP modules that can be used with 300 pin systems. For example, printed circuit board designs that have been prepared in accordance with principles of embodiments of the present invention may be implemented with XFP module designs to create an XFP based module with a 300 pin interface. Alternatively, an adapter module may be paired with an XFP module to create a stand alone product that may be implemented in legacy 300 pin systems. Other embodiments of the invention allow for the adapter module to be used separately as a stand alone product useful for upgrading 300 pin systems such that XFP modules are compatible with legacy systems and can be selectively installed in legacy systems.

Figure 2:
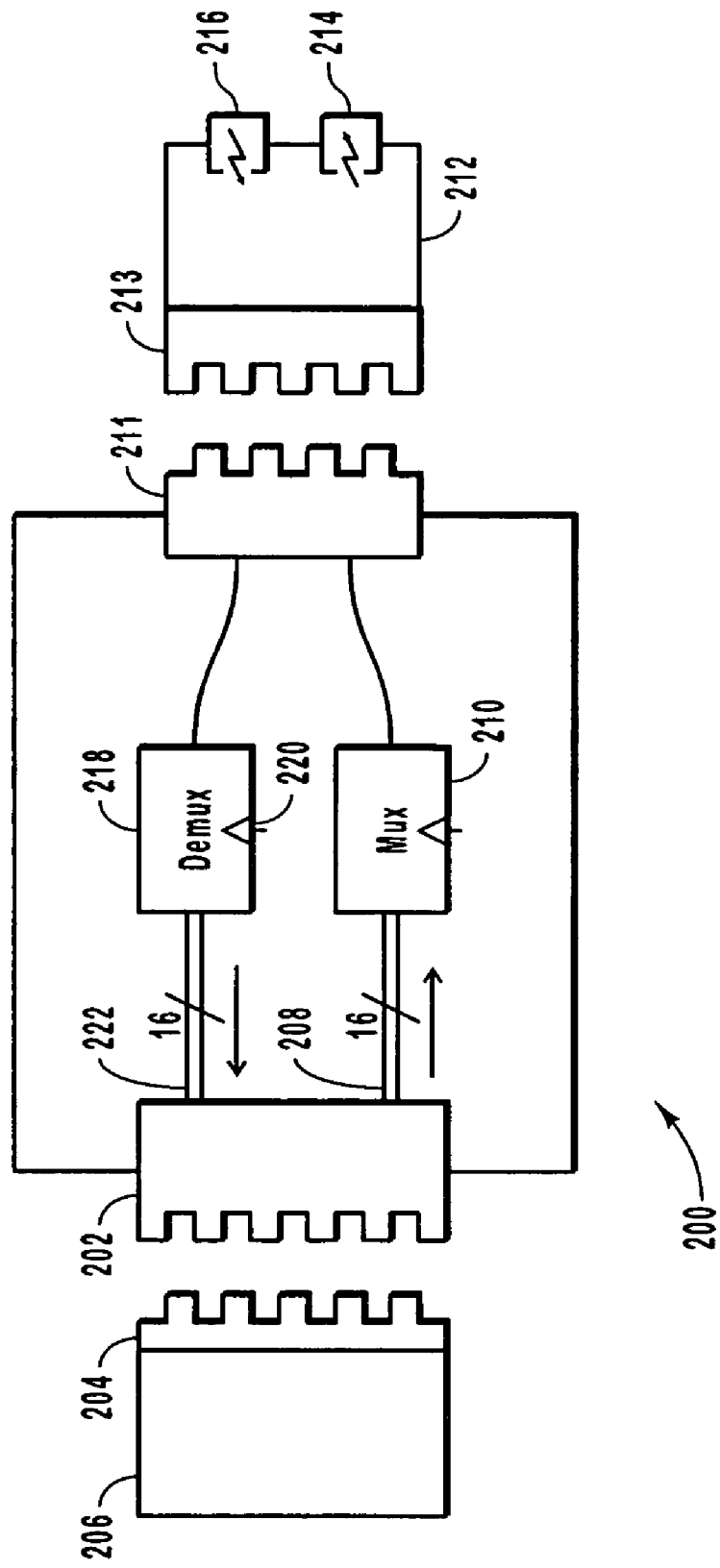
FIG. 2 illustrates an adapter module designed to interconnect 300 pin systems with XFP modules.

Referring now to FIG. 2, an adapter module designated generally at 200 is shown. The adapter module 200 has a 300 pin connector 202 for connection to a 300 pin mating connector 204 on a 300 pin physical layer device 206. A 16-line parallel transmit bus 208 is connected to the 300 pin connector 202. The transmit bus 208 is connected to a multiplexer 210. The multiplexer 210, that one embodiment of the invention is a deserializer, converts parallel data transmitted on the transmit bus 208 into a serial high-speed data transmission. This serial high-speed data transmission is organized according to an XFI interface protocol. The XFI interface protocol uses a 30 pin interface for use with XFP modules. The serial high-speed data stream is then passed to a 30 pin XFI connector 211. The XFI connector 211 is connected to a mating connector 213 on an XFP module 212. The XFP module 212 may be a standard XFP module including one of shortwave, DFB, and EML lasers, or any other transceiver module that complies with the XFP MSA standard. The XFP module 212 has appropriate circuitry, including for example lasers and laser drivers, for converting the serial high-speed data stream to an optical signal and outputting the optical signal through an optical output port 214.

Optical data is received by the XFP module 212 through an optical receive port 216 that is disposed on the XFP module 212. The optical data is converted into a serial high-speed data stream. The conversion may be facilitated by using, for example, photodiodes and related electronic circuitry. The serial high-speed data stream is sent through the XFI interface 211 to a demultiplexer 218. The demultiplexer 218, which in one embodiment of the invention is a deserializer, converts the serial high-speed data stream using an appropriate clock signal 220 into a 16 line parallel data stream. The 16 line parallel data stream is transmitted across a 16 line receive bus 222 to the 300 pin connector 202 and finally to the 300 pin physical layer device 206 through the 300 pin mating connector 204.

Figure 3A:
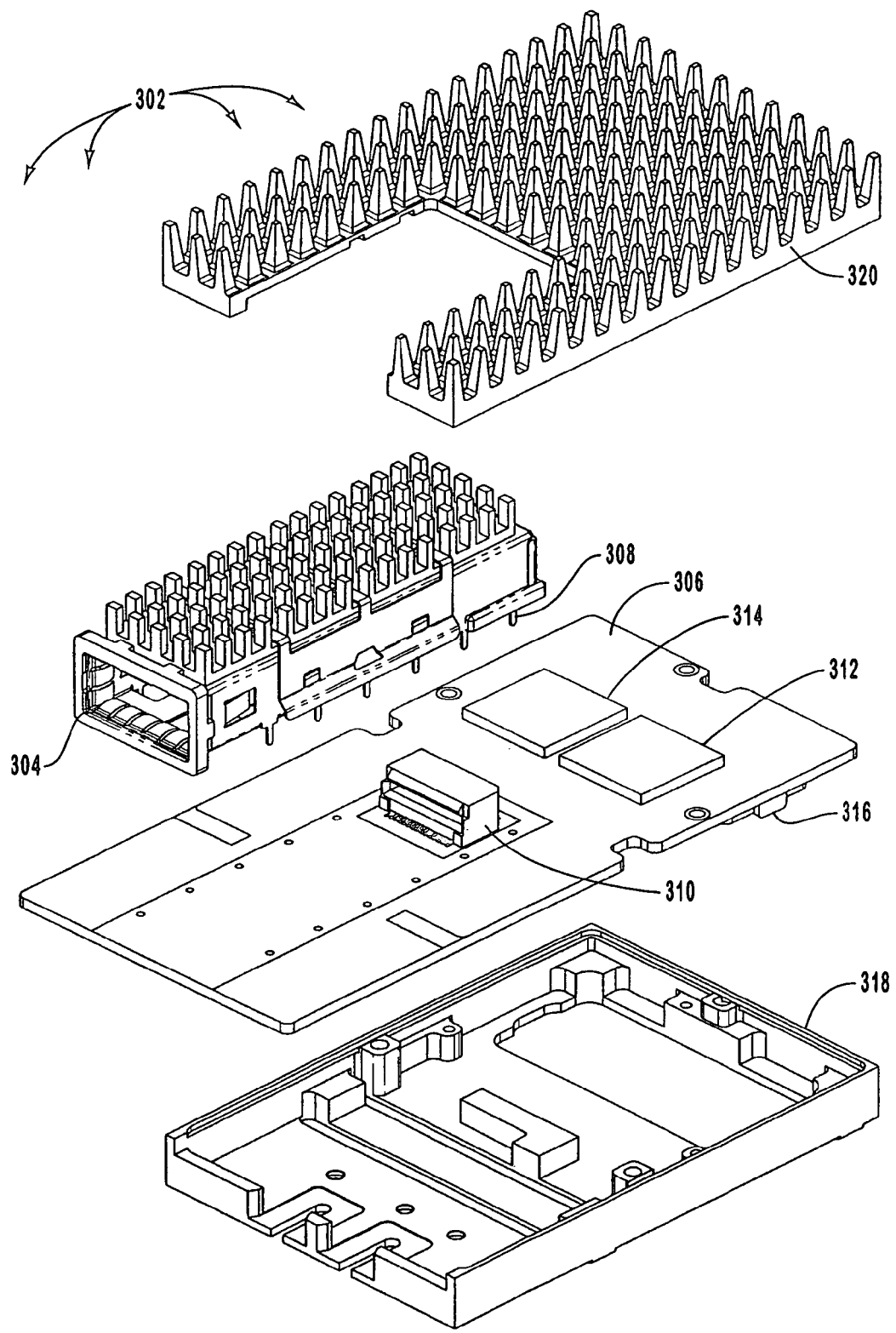
FIG. 3A illustrates an exploded view of an exemplary adapter module that may be used to implement various aspects of the present invention.
Figure 3B:
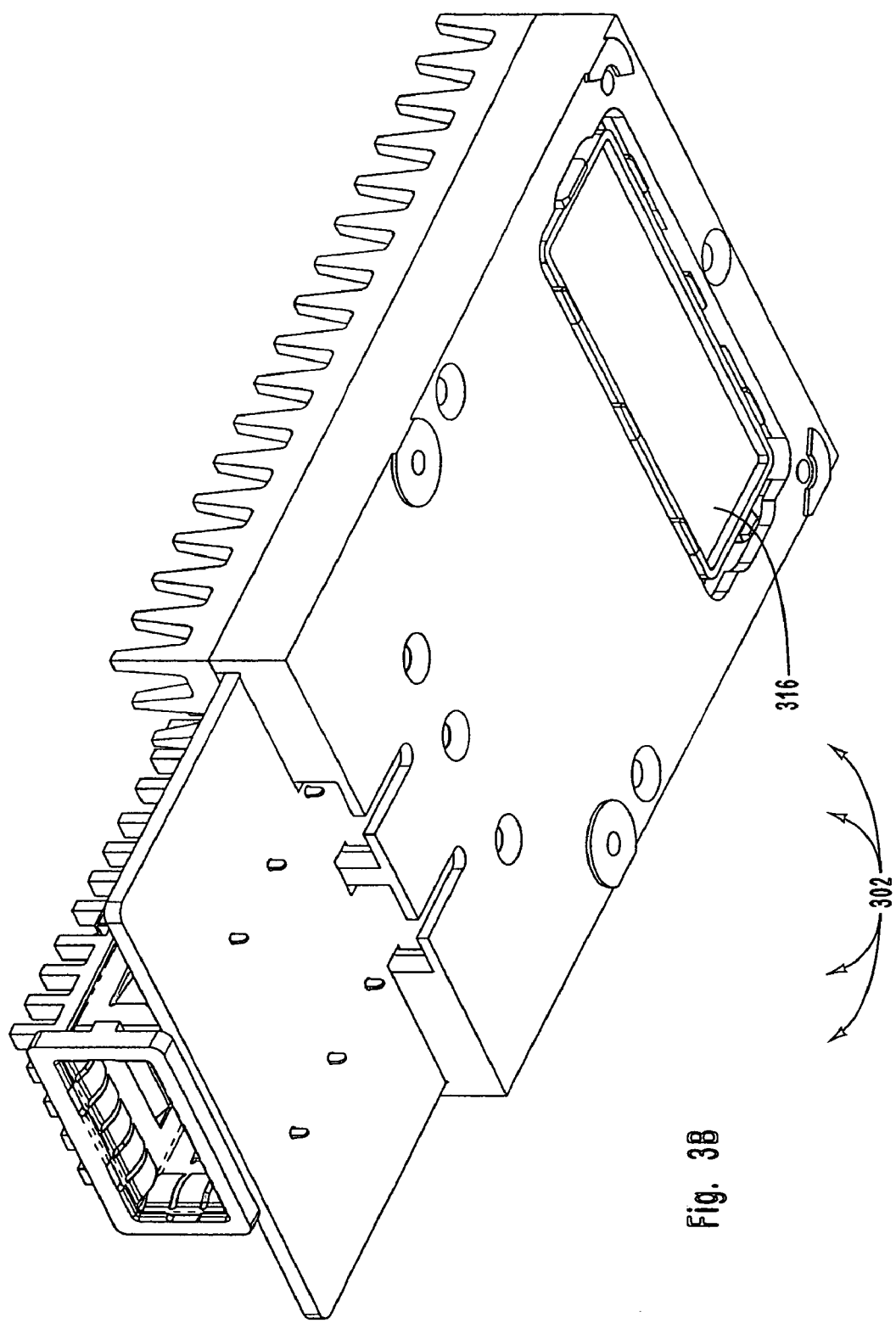
FIG. 3B illustrates an alternate view of the exemplary adapter module in FIG. 3A that may be used to implement various aspects of the present invention.

FIGS. 3A and 3B illustrate an adapter module for interfacing XFP modules with 300 pin systems. The adapter module 302 includes an XFP receptacle 304 that is mounted on a printed circuit board 306. The XFP receptacle 304 helps to ensure a secure mechanical fit of an XFP module into the adapter module 302. The XFP receptacle 304 also helps to connect the XFP module to the case for performing appropriate heatsinking. In this embodiment, the XFP receptacle 304 is mounted to the circuit board 306 using solder tabs 308. An XFP connector 310 is also mounted on the printed circuit board 306. Electrical connections on the printed circuit board 306 connect the XFP connector 310 to a multiplexer chip 312 and a demultiplexer chip 314. The multiplexer chip 312 and demultiplexer chip 314 are connected to a 300 pin connector 316. The 300 pin connector 316 may be used to connect to a 300 pin system with a mating connector. The printed circuit board 306 may be mounted in a case 318 and secured to the case 318 by screws. A heat sink 320 may be mounted to the multiplexer 312 and demultiplexer 314 providing heatsinking for these device as well as acting as a top enclosure for the case 318.

The modules described above can be used in a test-bed by a manufacturer to ensure that a particular XFP module is compatible with a given 300 pin physical layer device or system. This enables the manufacturer to make design decisions while reducing the overall cost of the design process. Should a manufacturer decide to implement a particular XFP module in an application, the manufacturer can be supplied with Gerber files (printed circuit board layouts) for the adapter module, such that a device integrating the functionality of an XFP module and a 300 pin interface can be manufactured in a cost effective way.

Figure 4:
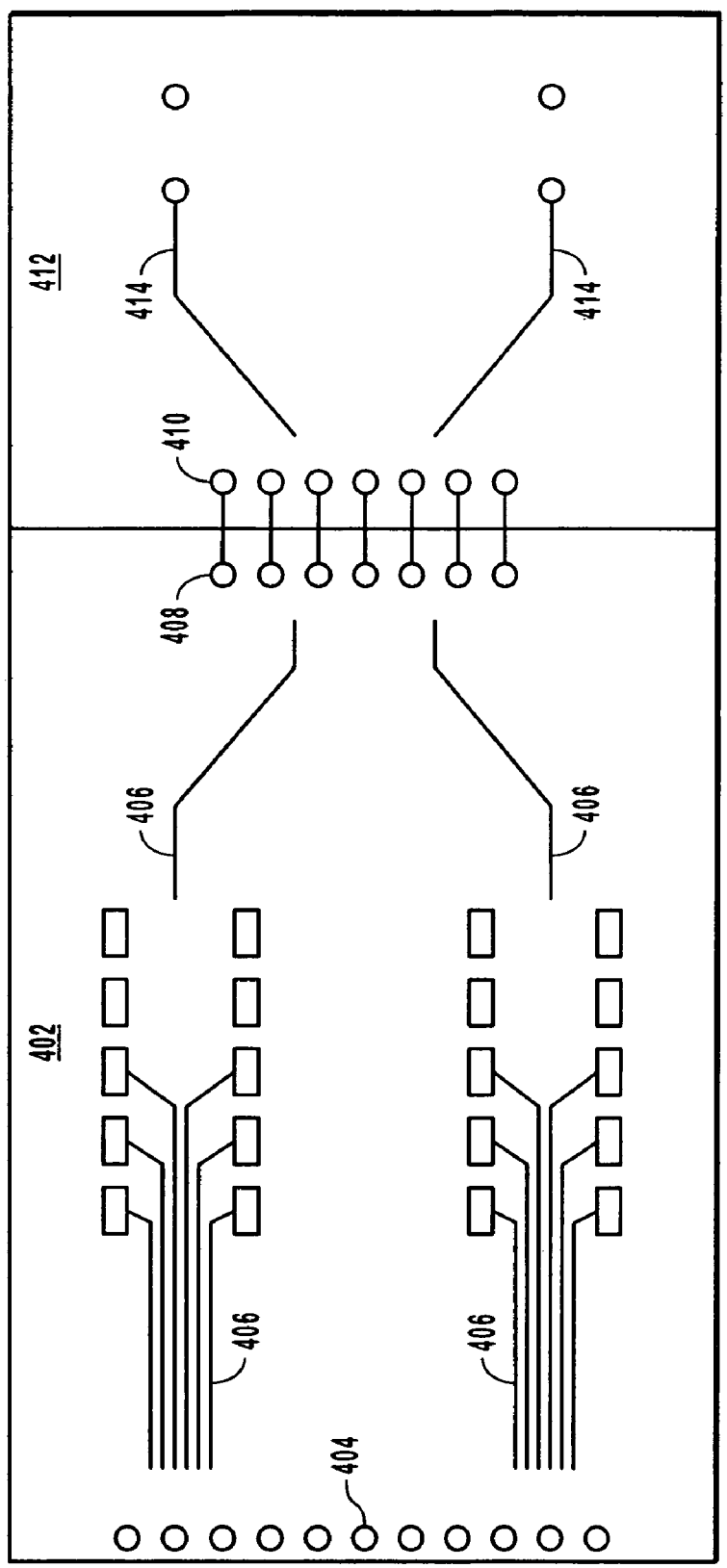
FIG. 4 illustrates a printed circuit board layout illustrating an adapter implementation.

FIG. 4 illustrates an example of how printed circuit board layouts may be supplied to facilitate implementing an XFP based module that includes a 300 pin interface. A printed circuit board layout 402 includes 300 pin connector traces 404. The 300 pin connector traces 404 allow a 300 pin connector to be mounted on a printed circuit board. The adapter layout also includes various routing and component traces 406 for routing signals and for providing connection points for mounting components when the traces 406 are formed on a printed circuit board. The components may be used, for example, to convert signals from SFI-4 or SXBI protocol to XFI protocol. Such components may include for example, multiplexers, demultiplexers, serializers, and deserializers. The printed circuit board layout 402 further includes 30 pin XFP traces 408. The 30 pin XFP traces 408 may be mated to corresponding 30 pin XFP traces 410 on an XFP layout 412. In one embodiment of the invention, the XFP traces 408 are arranged in a topology substantially similar to XFI connector traces, meaning that the XFP traces 408 are arranged similar to 30 pin XFI connector mounting points ordinarily used in XFP transceiver designs. This allows a transceiver designer to make minimal changes to an XFP layout to mate the XFP layout to the printed circuit board layout 402. The XFP layout 412 is a circuit board layout for implementing an XFP module. By using the printed circuit board layout 402, the XFP layout 412 can be designed to make the appropriate connections to the printed circuit board layout 402 for creating an XFP based module with a 300 pin interface. The XFP layout 412 further includes various other traces 414 for creating various interconnections or for providing mounting locations for various components including hardware typically associated with transceivers such as laser diodes, photo diodes, and supporting circuitry.

In one embodiment of the invention, the printed circuit board layout 402 can be provided to a transceiver designer. When the transceiver designer knows that a particular XFP design can be made compatible with legacy 300 pin systems or equipment, the transceiver designer can use the printed circuit board layout 402 as the foundation for a transceiver design. The printed circuit board layout 402 can be combined with the XFP layout to create a transceiver layout. The transceiver layout can then be formed on a printed circuit board by any appropriate technique. The transceiver layout can then be populated with the appropriate components including 300 pin connectors, XFP connectors, multiplexers, demultiplexers, laser diodes, photodiodes and the like.

When embodiments of the invention are implemented as printed circuit board layouts, those embodiments may comprise computer readable data on a computer readable medium such as, but not limited to, CD and DVD media, computer hard drives, floppy drives, flash memory such as removable data cards, traditional computer memory, etc. Computer readable embodiments of the invention may be transferred via such methods as email, downloads from a central server, local and wide area network transmissions, and the like.

Additionally, existing systems incorporating 300 pin devices may be enhanced without the need for an expensive system overhaul by implementing the adapter module disclosed herein alone or in combination with a particular XFP module as an end product intended for installation into the system. In this manner, network administrators who have electrical components with the 300 pin architecture can conveniently upgrade their networks for use with XFP optical transceiver modules or other new optical transceivers without the need to discard the existing electrical components and the associated 300 pin connectors.

Embodiments of the invention also allow transceiver designers to work outside of the IEEE standards for 300 pin devices. Transceiver designers implementing aspects of the present invention are no longer bound by certain requirements and can thus locate components such as connectors, thermal management, etc. in locations that are most effective as opposed to locations specified by a particular IEEE standard. In this way, while the interface itself complies with IEEE standards to ensure compatibility, many other design decisions may be left to the transceiver designer.

While the present invention is disclosed in the context of establishing an interface or an adapter module between a 300 pin electrical device or system and an XFP optical transceiver module, the principles of the present invention are also applicable to adapter modules that are used to connect other optical transceiver modules with legacy 300 pin connector systems and associated electrical devices. The present invention may be embodied in other specific forms without departing from its spirit or essential characteristics. The described embodiments are to be considered in all respects only as illustrative and not restrictive.

What is claimed is:

1. An adapter module for interfacing a 300 pin system with an XFP optical transceiver module, the adapter module comprising:
   a 300 pin connector adapted to couple to a 300 pin mating connector on a 300 pin system;
   a parallel transmit bus coupled to the 300 pin connector and adapted to carry a parallel data transmission;
   a multiplexer coupled to the parallel transmit bus, wherein the multiplexer is configured to convert a parallel transmission into a serial high-speed XFI data transmission;
   an XFI connector coupled to the multiplexer through a serial transmit line, wherein the XFI connector is adapted to couple to an XFP module;
   a demultiplexer coupled to the XFI connector by a serial receive line, wherein the demultiplexer is adapted to convert a serial high-speed XFI data stream into a parallel data stream; and
   a parallel receive bus coupled to the demultiplexer wherein the parallel receive bus is adapted to transmit a parallel data stream from the demultiplexer to the 300 pin connector.

2. The adapter module of claim 1, further comprising an XFP module coupled to the XFI connector.

3. The adapter module of claim 2, wherein the XFP module comprises at least one of an EML, DFB, or shortwave laser.

4. The adapter module of claim 1, wherein the adapter module is configured as a test bed for testing XFP modules for compatibility with legacy 300 pin systems.

5. The adapter module of claim 1, wherein the adapter module is configured as a stand alone product intended to be installed in legacy 300 pin systems for upgrading legacy 300 pin systems to be able to implement XFP modules.

6. The adapter module of claim 1, further comprising a receptacle adapted to mechanically secure an XFP module in the adapter.

7. The adapter module of claim 1, further comprising a heatsink coupled to the multiplexer and demultiplexer.

8. A printed circuit board layout for providing a 300 pin connection to an XFP optical transceiver design, the printed circuit board layout comprising:
   300 pin connector traces configured to allow a 300 pin connector to be mounted on a printed circuit board;
   component traces coupled to the 300 pin connector traces, wherein the component traces are arranged to allow for components that can be used to convert signals using a 300 pin protocol to and from signals using an XFI protocol to be mounted to the components traces;
   XFP traces coupled to the component traces, the XFP traces arranged to allow a circuit designer to design XFP circuitry including XFP layout traces that extend from the XFP traces.

9. The printed circuit board layout of claim 8, wherein the XFP traces are arranged in a topology substantially similar to XFI connector traces.

10. A computer readable medium comprising computer readable code comprising the printed circuit board layout of claim 8.

11. A Gerber file comprising the computer readable medium of claim 10.

12. The computer readable medium of claim 10 comprising at least one of CD and DVD media, computer hard drives, floppy drives, flash memory and traditional computer memory.

13. The printed circuit board layout of claim 8, being comprised of computer readable data that may be transferred via a computer network.

14. A method of designing transceivers comprising:
   receiving a printed circuit board layout comprising 300 pin connector traces, component traces coupled to the 300 pin connector traces, the component traces adapted to receive circuitry for converting 300 pin signals to XFI signals; and XFP traces coupled to the component traces;
   testing an XFP module in a 300 pin system using an adapter wherein the adapter comprises a 300 pin connector coupled to circuitry for converting 300 pin signals to XFI signals, wherein the circuitry is further coupled to an XFI connector coupled to the XFP module;
   if testing indicates that the XFP module is compatible with the 300 pin system:
   forming the printed circuit board layout on a printed circuit board;
   forming XFP layout traces coupled to the printed circuit board traces on the printed circuit board; and
   populating the printed circuit board.

15. The method of claim 14, wherein receiving a printed circuit board layout comprises receiving the printed circuit board layout on a computer readable medium.

16. The method of claim 14, wherein receiving a printed circuit board layout comprises receiving the printed circuit board layout from at least one of email, downloads from a central server, local area network transmission and wide area network transmission.

* * * * *